Patented June 23, 1942

2,287,444

UNITED STATES PATENT OFFICE 2,287,444

PROCESS FOR OBTAINING CLEAR EXTRACTS FROM SEMILIQUID MIXTURES

Max Rudolf Morgenthaler, Vevey, Switzerland, assignor, by mesne assignments, to Inredeco, Inc., Panama City, Panama, a corporation of Panama No Drawing. Application December 3, 1940, Serial No. 368,320. In Germany April 4, 1938

5 Claims. (Cl. 99—22)

This invention relates to a process for obtaining clear extracts from semi-liquid food masses, one of the objects of the invention being to obtain in such clear extracts, the valuable or desired constituents present in such a semi-liquid or pulpy food mass.

A further object of the invention is to obtain a clear extract which contains all the aromatic, flavoring and coloring substances which may be present in a semi-liquid or pulpy food mass.

A further object of the invention is to obtain clear aqueous extracts from food substances which contain suspended colloidal particles and which cannot be filtered in the usual way. The designation food substances includes fruits, even though the extracts are used as beverages or as flavoring materials.

The great advantage of the extracts resulting from this process is that they contain practically no solid particles and therefore do not form any sediment in a beverage prepared from the same. According to my process, the pulpy mixture or pap to be treated is preferably of such a nature as to permit the gelatinization of starch which is added to said pulpy mixture or pap. The pulpy mixture or pap is mixed with a suspension of starch, and the mixture is heated, until the starch is gelatinized. This mixture is then frozen by a slow freezing process. The mixture is then thawed, and subsequently pressure is applied to the mixture in order to separate it into clear extract and into a residue which has acted as a filter during the application of the pressure. The insoluble constituents of the extract are retained by the starch, whereas the soluble constituents, containing all the aromatic and most of the flavoring and coloring substances, pass through the starch layer, to form the clear extract. The main object of my invention is to secure said clear food extract.

Different raw materials can be treated by the process, such as fruits, vegetables, meat and raw sugar. The respective extracts of which may be used as beverages or in soups. The remaining residue consists of edible substances and starch. The starch may later be treated with malt and transformed into malto-dextrine, so as to render the residue suitable for alimentary purposes, when the residue is added to other foodstuffs.

A second class of raw materials, such as cocoa, almonds and nuts, must be treated differently, because when soaked in water they swell, retaining most of the water, and consequently treatment by simple pressure remains ineffective. In such cases, the pulp is first treated with an active malt solution in order to make it more fluid and the pulp is then mixed with a starch suspension and it is subjected successively to gelatinization, freezing, and thawing. A first clear extract of the starch is then obtained by pressure. This extract contains all the aromatic and most of the flavoring and coloring constituents of the raw material. The residue consists of gelatinized starch and of the water-insoluble part of the raw material, such as cellulose, fat, etc. These water-insoluble substances are separated from said residue by mixing the residue with cold water, thoroughly malting the starch and then subjecting the residue to strong pressure, preferably in a centrifuge. The insoluble parts of the mass under treatment remain therein, and a second liquid extract is obtained, which contains most of the flavoring and coloring matter of the raw material which has been retained in the residue after the first treatment, and also a certain quantity of transformed starch. This extract, however, is not clear. It is therefore mixed with a fresh suspension of starch and subjected successively to gelatinization, freezing, thawing, and pressure. This results in the product of a second extract which contains the remainder of the flavoring and coloring substances of the raw material and also the water-soluble malto-dextrine. This second extract may be concentrated and subsequently added to the first extract.

The mixture of the first and second extracts is either used in liquid form or it is dried, by known methods, whereby its aroma and flavor are retained to an even greater extent, since malto-dextrine, as is well known, acts as a sealer of the volatile aromatic substances.

The residue of the second extract is used again in a subsequent batch.

It is important for this process that the starch gelatinizes properly. It is therefore necessary that the paps which are mixed with the starch, should be heated at least to the temperature at which the specific kind of starch used gelatinizes. This temperature is approximately 65° C. for potato starch or approximately 80° C. for corn starch. To prevent loss of aroma, a starch having the lowest possible gelatinizing temperature should be used. Instead of starch and as an equivalent for starch, it is also possible to use a product which is rich in starch, as, for example, cereal flours of wheat, tapioca, sago, etc., which contain other soluble constituents which become soluble during the process and which enter the liquid extract.

The process can also be used to obtain water-soluble vitamin or spice extracts, which require careful treatment to avoid impairing their potency and flavor. The process can be varied according to circumstances and the nature of the paps undergoing treatment.

The following examples show some practical applications:

*Example 1.*—A vegetable, such as cabbage, spinach, or celery, is stewed in a little water to bring it to a pappy mass whose temperature is about 100° C. To this is added a suspension of starch in cold water, until a homogeneous paste is formed, in which all the vegetable particles are imbedded. The starch in this paste is gelatinized. This paste is successively frozen, thawed and then treated by pressure (centrifuge) to obtain a clear juice which contains all the mineral salts, vitamins, and aromatic and flavoring substances of the vegetable.

*Example 2.*—Fruits can, in many instances, be treated in the same way as according to Example No. 1, but to avoid loss or change of aroma and flavoring when treating fruits like oranges or tomatoes, they are converted into a cold pap by mechanical disintegration. To this pap a cold suspension in water of about 10% of potato starch is added and the mixture is quickly heated and vigorously stirred in order to obtain a homogenous starchy paste which is successively frozen and thawed. The starch in this paste is gelatinized. By means of centrifuging, a fully aromatic, clear fruit juice is obtained, which is preserved according to known methods.

In both examples (1) and (2) the residue forms an edible mass which may be used in preparing vegetable soups, cakes or puddings.

*Example 3.*—15 kgs. of defatted cocoa are mixed with 75 liters of cold water. This mashy, semi-liquid substance is heated to 75° C. with constant stirring. When this temperature is reached, 2 liters of an active malt solution (containing about 8.0% by weight of solids) are added, and cooking is continued for 15 minutes at 75° C. and subsequently for 5 minutes at 100° C. This temperature is then reduced to 75° C. and a second solution of two liters of active malt is added. After another 15 minute period of cooking, the mass is brought to boiling point and the supply of the heat is then immediately discontinued. The malt reacts with the starch of the defatted cocoa in the usual manner to degrade the starch, thus rendering the mass more fluid. A suspension of 9 kgs. of starch in 9 liters of cold water is then rapidly added, whilst stirring vigorously. As the starch gelatinizes, the whole mixture is transformed into a gelatinous mass which, however, can still be poured into suitable moulds, in which the mass is first frozen and subsequently thawed. It is now possible, by pressing or centrifuging, to separate the water-soluble part of the mass from its water-insoluble part. The first run consists of 50 liters of a liquid which contains 6% by weight of solids, namely, 3 kgs. of water-soluble cocoa solids (extract No. 1). The residue consists of 20 kgs. of water-insoluble solids. The residue is taken out of the press or the centrifuge while the residue is still wet and the residue is diluted by approximately 100 liters of cold water. After heating to 75° C., two liters of an active malt solution are added, whereupon the mass is cooked for 15 minutes at 75° C., subsequently boiled at 100° C. for 5 minutes, and then cooled down to 75° C. Another solution of three liters of active malt is added, the mass is cooked again for 15 minutes at 75° C. and it is then brought to the boiling point of 100° C. The supply of heat is then immediately discontinued, and after cooling, the mass is subjected to strong pressure, preferably in a centrifuge, which results in the separation of the water-soluble from the water-insoluble parts of the mass under treatment. The liquid extract (No. 2) which is thus obtained, contains not only practically all the water-soluble constituents of those cocoa particles which have been retained in the residue after the first treatment, but also a certain quantity of transformed starch. Extract No. 2 is, however, not as clear as extract No. 1, and, therefore, after suitable concentration, it is mixed with another starch suspension. The starch in the mixture is gelatinized and the mixture is then frozen and it is subsequently thawed out. The liquid part of the mixture is then separated from the solid part by centrifuging and the liquid part is filtered to secure a clear extract No. 2, containing approximately 2 kgs. of water-soluble cocoa solids and 7 to 7½ kgs. of malto-dextrine solids derived from starch, and an insoluble residue, composed practically of starch only, which can be reworked into a new batch. Extract No. 1 plus extract No. 2, when intermixed, form a liquid, filtered extract containing approximately 40% of cocoa solids and 60% of malto-dextrine solids. The former represents practically all the aromatic, flavoring and coloring substances of the cocoa used in the process. The latter forms a very suitable carrier, which fixes said volatile constituents when said intermixed extract is dried to form a solid residue. The separation of the water and its solutes from the gelatinized starch and the solid particles which are held in the gelatinized starch, by pressure in a filter press or by means of a centrifuge, is designated as mechanical separation.

I have given herein a series of examples relating to the treatment of vegetables, fruit, cocoa and the like, but it is apparent that the process is applicable to a wide range of food substances other than those specifically named herein.

When I refer to gelatinized starch, I refer to starch whose granules have been ruptured by treatment with hot water at a suitable high temperature.

Having fully described my invention, what I claim is:

1. A method of clarifying an aqueous extract of a food, said extract containing finely divided solid particles in suspension, which consists in transforming said extract into a paste with the use of gelatinized starch, then refrigerating said paste to freeze the water thereof, then thawing said paste to liquefy the water thereof, then mechanically separating the water and the substances which are dissolved therein from the gelatinized starch, sufficient gelatinized starch being thus used to retain substantially all said solid particles during said separation.

2. A method of producing a clear aqueous extract of a food, which consists in producing an aqueous paste-pap of said food with the use of gelatinized starch, said paste-pap containing suspended particles of said food, then refrigerating said paste-pap to freeze the paste-pap into solid form, then thawing the paste-pap to liquefy the water thereof, then mechanically separating the water and its solutes from the gelatinized starch of said paste-pap while retaining said particles in the gelatinized starch, sufficient starch being thus used to act as a filter during said separation.

3. A method of clarifying an aqueous extract of a food, said extract containing finely divided solid particles in suspension, which consists in adding ungelatinized starch to said extract, then gelatinizing the starch, sufficient starch being used to take up and to retain said solid particles when the starch is gelatinized, refrigerating the mixture of extract and gelatinized starch to freeze said mixture into solid form, then thawing said mixture to liquefy the water thereof, then mechanically separating the water and its solutes from the gelatinized starch while retaining said particles in the gelatinized starch, sufficient gelatinized starch being used so that the thawed mass has sufficient consistence and sufficient gelatinized starch so that said gelatinized starch acts as a self-filter during said separation.

4. A method of producing a clear aqueous extract of a starch-containing food, which consists in making an aqueous infusion of said food, said infusion being intermixed with the water-insoluble part of said food, then heating said mixture with malt to degrade said starch and to make said mixture more fluid, then adding ungelatinized starch to said mixture and gelatinizing the starch to produce a gelatinous mass, then successively freezing said mass into solid form and thawing said mass to liquefy the water thereof, then mechanically separating the water of said mass from the solid residue thereof, enough gelatinized starch being used to retain substantially all the solid constituents of said mass during said separation.

5. A method of making a clear aqueous extract of defatted cocoa which consists in mixing said defatted cocoa with water to form a mashy mixture, heating said mashy mixture with sufficient aqueous malt solution to malt the starch of the cocoa and to make the mashy mixture more fluid, then adding ungelatinized starch to said mashy mixture and then gelatinizing the starch, then successively freezing the resultant mass to solid form and thawing the frozen mass to liquefy the water thereof, then mechanically separating the water and its solutes from the solid residue of the thawed mass, sufficient gelatinized starch being used so that the thawed mass has sufficient consistence and sufficient gelatinized starch so that said gelatinized starch acts as a self-filter during said separation.

MAX RUDOLF MORGENTHALER.